US012187038B2

(12) United States Patent
Smith et al.

(10) Patent No.: US 12,187,038 B2
(45) Date of Patent: Jan. 7, 2025

(54) METHOD OF OPERATING A PRINTHEAD

(71) Applicant: VIDEOJET TECHNOLOGIES INC., Wood Dale, IL (US)

(72) Inventors: Robert Smith, Northamptonshire (GB); Philip John Blowfield, Northamptonshire (GB)

(73) Assignee: Videojet Technologies Inc., Wood Dale, IL (US)

( * ) Notice: Subject to any disclaimer, the term of this patent is extended or adjusted under 35 U.S.C. 154(b) by 257 days.

(21) Appl. No.: 17/788,389

(22) PCT Filed: Dec. 21, 2020

(86) PCT No.: PCT/GB2020/053320
§ 371 (c)(1),
(2) Date: Jun. 23, 2022

(87) PCT Pub. No.: WO2021/130476
PCT Pub. Date: Jul. 1, 2021

(65) Prior Publication Data

US 2023/0030861 A1 Feb. 2, 2023

(30) Foreign Application Priority Data

Dec. 23, 2019 (GB) ...................................... 1919228

(51) Int. Cl.
*B41J 2/165* (2006.01)
*B41J 2/035* (2006.01)

(52) U.S. Cl.
CPC ........... *B41J 2/16552* (2013.01); *B41J 2/035* (2013.01); *B41J 2002/16573* (2013.01); *B41P 2235/27* (2013.01)

(58) Field of Classification Search
CPC ...... B41J 2/16552; B41J 2/035; B41J 2/1714; B41J 2/08; B41J 2002/16573;
(Continued)

(56) References Cited

U.S. PATENT DOCUMENTS 6,273,103 B1 * 8/2001 Enz ...................... B41J 2/16526 347/76
7,150,512 B2 12/2006 Levin et al.
(Continued)

FOREIGN PATENT DOCUMENTS

DE 4332257 A1 9/1993
EP 3575091 A1 4/2019
(Continued)

OTHER PUBLICATIONS

Search Report for GB1919228.5, dated Jun. 25, 2020, 3 pages.
(Continued)

*Primary Examiner* — Kristal Feggins
(74) *Attorney, Agent, or Firm* — DeLizio, Peacock, Lewin & Guerra, LLP

(57) ABSTRACT

A method of operating a continuous inkjet printer (1). The printer comprise a printhead. The printhead comprises a droplet generator (16) comprising a printing nozzle (17) for ejecting an ink jet for printing, at least one electrode (22, 23) for steering the inkjet, and a gutter (18) having an ink receiving orifice (24) for receiving parts of the ink jet which are not used for printing. The method comprises performing a cleaning operation. Said cleaning operation comprises: ejecting a solvent jet from the printing nozzle towards the gutter; and causing at least a portion of the solvent jet to contact at least a part of the gutter (18) surrounding the orifice (24) for cleaning said part of the gutter surrounding the orifice.

26 Claims, 6 Drawing Sheets

(58) Field of Classification Search
CPC ...... B41J 2002/1853; B41J 2/185; B41J 2/02; B41J 2/07; B41P 2235/27
See application file for complete search history.

(56) References Cited

U.S. PATENT DOCUMENTS

| | | | |
|---|---|---|---|
| 8,449,054 | B2 | 5/2013 | Harris et al. |
| 10,421,303 | B2 | 9/2019 | Stamp et al. |
| 2004/0066428 | A1 | 4/2004 | West et al. |
| 2017/0241929 | A1 | 8/2017 | Qui et al. |
| 2018/0170040 | A1 | 6/2018 | Desideri |
| 2018/0292484 | A1 | 10/2018 | Hoppe et al. |
| 2019/0033974 | A1 | 1/2019 | Mu et al. |

FOREIGN PATENT DOCUMENTS

| | | | |
|---|---|---|---|
| JP | S5727757 | A | 2/1982 |
| WO | 19980683 | A1 | 2/1998 |
| WO | 199806583 | A1 | 2/1998 |
| WO | 199901288 | A1 | 1/1999 |
| WO | 2017077293 | A1 | 5/2017 |

OTHER PUBLICATIONS

Chen, Ruijuan et al., "A Novel Algorithm for High-Resolution Magnetic Induction Tomography Based on Stacked Auto-Encoder for Biological Tissue Imaging", IEE Access, 2019, vol. 7, 10 pages.
GB2004601.7, Search Report, Jan. 5, 2021, 2 pages.
PCT/GB2020/053320; Search Report & Written Opinion, Mar. 11, 2021, 15 pages.

* cited by examiner

METHOD OF OPERATING A PRINTHEAD

TECHNICAL FIELD

The present invention relates to a method of operating a printhead for a continuous inkjet printer, and to a continuous inkjet printer configured to perform the method.

BACKGROUND

In ink jet printing systems the print is made up of individual droplets of ink generated at a nozzle and propelled towards a substrate. There are two principal systems: drop on demand where ink droplets for printing are generated as and when required; and continuous ink jet printing in which droplets are continuously produced and only selected ones are directed towards the substrate, the others being recirculated to an ink supply.

Continuous ink jet printers supply pressurised ink to a printhead drop generator where a continuous stream of ink emanating from a nozzle is broken up into individual regular drops by, for example, an oscillating piezoelectric element. The drops are directed past a charge electrode where they are selectively and separately given a predetermined charge before passing through a transverse electric field provided across a pair of deflection plates. Each charged drop is deflected by the field by an amount that is dependent on its charge magnitude before impinging on the substrate whereas the uncharged drops proceed without deflection and are collected at a gutter from where they are recirculated to the ink supply for reuse. The charged drops bypass the gutter and hit the substrate at a position determined by the charge on the drop and the position of the substrate relative to the printhead. Typically the substrate is moved relative to the printhead in one direction and the drops are deflected in a direction generally perpendicular thereto, although the deflection plates may be oriented at an inclination to the perpendicular to compensate for the speed of the substrate (the movement of the substrate relative to the printhead between drops arriving means that a line of drops would otherwise not quite extend perpendicularly to the direction of movement of the substrate). The various components of the printhead are typically contained within a cover tube.

In continuous ink jet printing a character is printed from a matrix comprising a regular array of potential drop positions. Each matrix comprises a plurality of columns (strokes), each being defined by a line comprising a plurality of potential drop positions (e.g. seven) determined by the charge applied to the drops. Thus each usable drop is charged according to its intended position in the stroke. If a particular drop is not to be used then the drop is not charged and it is captured at the gutter for recirculation. This cycle repeats for all strokes in a matrix and then starts again for the next character matrix.

Ink is delivered under pressure to the printhead by an ink supply system that is generally housed within a sealed compartment of a cabinet that includes a separate compartment for control circuitry and a user interface panel. The system includes a main pump that draws the ink from a reservoir or tank via a filter and delivers it under pressure to the printhead. As ink is consumed the reservoir is refilled as necessary from a replaceable ink cartridge that is releasably connected to the reservoir by a supply conduit. The ink is fed from the reservoir via a flexible delivery conduit to the printhead. The unused ink drops captured by the gutter are recirculated to the reservoir via a return conduit by a pump. The flow of ink in each of the conduits is generally controlled by solenoid valves and/or other like components.

As the ink circulates through the system, there is a tendency for it to thicken as a result of solvent evaporation, particularly in relation to the recirculated ink that has been exposed to air in its passage between the nozzle and the gutter. In order to compensate for this, "make-up" solvent is added to the ink as required from a replaceable solvent cartridge so as to maintain the ink viscosity within desired limits. The ink and solvent cartridges are filled with a predetermined quantity of fluid and generally releasably connected to the reservoir of the ink supply system so that the reservoir can be intermittently topped-up by drawing ink and/or solvent from the cartridges as required. This solvent may also be used for flushing components of the printhead, such as the nozzle and the gutter, in a cleaning cycle.

Cleaning of the printhead is required since there are various sources of contamination during the printing process; during operation of continuous ink jet printheads, the printhead components are known to become lightly coated with ink and other foreign bodies. The principle causes of the coating are a brief transient spray created as the jet is started and stopped, the continuous albeit very light coating caused by charged microsatellites that are formed during the jet breakoff and charging process, and some splash back from the substrate. According to the ink type and application, the customer is required to clean the printhead on a frequent basis ranging from daily to monthly intervals. The current cleaning process typically involves stopping the ink jet, removing the printhead from the printing location, removing the cover tube or printhead casing from the printhead, placing the printhead in a waste collection vessel, and spraying or pouring solvent onto the contaminated areas of the printhead to clean those areas. This cleaning process tends to be messy for the customer, requires specialist equipment (for example, gloves and glasses etc.), takes a lot of time, requires large quantities of solvent, much of which may go to waste, and if the cleaning process is not performed properly (for example, not performed thoroughly enough and/or on the required time basis) this may lead to printer unreliability. It would therefore be desirable to provide an improved cleaning process for the printhead.

It would be desirable to provide a method of cleaning a printhead that overcomes one or more of the above problems. It would be desirable to provide a printer that is configured to perform an improved printhead cleaning process. It would be desirable to provide a printer that at least partially, or fully, automates the printhead cleaning process. It would be desirable to provide a printhead cleaning process that reduces the amount of solvent required.

SUMMARY

According to a first aspect of the invention there is provided a method of operating a continuous inkjet printer. The printer comprises a printhead. The printhead comprises a droplet generator comprising a printing nozzle for ejecting an ink jet for printing, at least one electrode for steering the ink jet, and a gutter having an ink receiving orifice for receiving parts of the ink jet which are not used for printing. The method comprises performing a cleaning operation. Said cleaning operation comprises: ejecting a solvent jet from the printing nozzle towards the gutter; and causing at least a portion of the solvent ejected in the jet to contact at least a part of the gutter surrounding the orifice for cleaning said part of the gutter surrounding the orifice.

During printing, deposits of ink can form on various parts of the printhead, such as, for example, the external surface of the gutter which surrounds the orifice. By ejecting solvent from the printing nozzle, and causing the solvent to contact parts of the gutter surrounding the orifice, it is possible to wash away such deposits of ink, thereby preventing these deposits from interfering with printing operation.

By ejecting solvent from the printing nozzle, rather than by performing a manual wash process, it is possible simplify the cleaning process, and to minimise solvent usage (e.g. by ensuring the solvent is accurately directed at the areas of interest). For example, a cleaning process of this type may use around 3.5 ml of solvent to effectively clean a gutter, whereas a manual cleaning operation performed using a wash bottle may, for example, use around 35 ml of solvent.

Moreover, by ejecting solvent from the printing nozzle, rather than from a dedicated solvent ejection nozzle, washing can be performed by a conventional printhead, which has not been specifically modified or adapted for this process (for example by the addition of a dedicated solvent ejection nozzle and associated solvent lines and valves). That is, it is possible to perform this cleaning method using existing hardware, and therefore without adding complexity to the design of existing print heads.

Advantageously, the cleaning method may be performed using printers that are already in operation, by providing a software upgrade.

The solvent jet may be ejected from the printing nozzle towards the gutter along a printing axis which extends from the nozzle to the orifice in a straight line.

Causing the solvent to contact the gutter for cleaning may comprise causing the solvent jet to impinge on said at least a part of the gutter surrounding the orifice. The jet may directly or indirectly impinge on said at least a part of the gutter surrounding the orifice. For example, the jet may be directed so as to strike the external surface of the gutter directly, or may enter the gutter orifice, but then be caused to overflow from the gutter orifice, and thereby flow onto said at least a part of the gutter surrounding the orifice.

The gutter may comprise an ink receiving orifice for receiving ink drops of the ink jet which are not used for printing. The gutter may be provided at a fixed location relative to the nozzle. Each of the gutter and the nozzle may be provided at respective fixed locations on the printhead body.

The at least one electrode may be provided at a fixed location relative to the nozzle and the gutter. The first and second deflection electrodes may be provided at a fixed location relative to the nozzle and the gutter.

The continuous inkjet printer may comprise an ink supply system operable to supply ink to the print head. The ink supply system may also be operable to supply solvent the print head. The ink supply system may comprise an ink cartridge. The ink supply system may comprise a solvent cartridge. The ink supply system may be operable to supply solvent based ink to the printhead during a printing operation and to supply solvent to the printhead during the cleaning operation.

The printer may further comprise a suction source connected to the gutter by a gutter line and configured to apply a negative pressure to the gutter during printing to draw ink which is not used for printing along the gutter line. The method may comprise disabling the suction source for at least a portion of the time when said solvent jet is ejected from the printing nozzle towards the gutter.

Whereas non-printed drops of ink are usually collected by the gutter (under the effect of the suction source), and carried away from the gutter along the gutter line, by disabling the suction source, solvent being directed into the gutter orifice from the nozzle will quickly accumulate and overflow from the orifice, thereby flowing from the orifice onto the regions of the external surface of the gutter which surround the orifice. In this way, it is possible to wash away deposits of ink around the gutter orifice.

The suction source and/or the solvent jet may be pulsed on and off during a cleaning operation. Disabling the suction source may comprise disabling a pump and/or controlling a valve to disconnect a negative pressure source from the gutter (e.g. by closing a valve to prevent the negative pressure source from reaching the gutter, or by opening a valve to allow the negative pressure source to be directed away from the gutter.

Causing at least a portion of the solvent ejected in the jet to contact at least a part of the gutter surrounding the orifice for cleaning said part of the gutter surrounding the orifice may comprise causing at least a portion of the solvent jet to contact at least a part of the gutter surrounding the orifice.

Causing at least a portion of the solvent to contact at least a part of the gutter surrounding the orifice for cleaning may comprise causing the solvent jet to deviate from a printing axis which extends from the nozzle to the gutter orifice.

Causing the solvent jet to deviate from the printing axis may comprise generating an electrostatic field for deflecting the solvent jet.

By generating the electrostatic field, it is possible to induce a charge on the solvent jet, to cause the solvent jet to deviate from the printing axis and impinge on the regions of the external surface of the gutter which surround the orifice.

Generating said electrostatic field may comprise applying a steering voltage to the at least one electrode.

The at least one electrode may comprise an electrode assembly.

The electrode assembly may comprise first and second deflection electrodes for creating an electrostatic field for deflecting ink drops carrying trapped electric charges. Generating said electrostatic field may comprise applying a steering voltage between the first and second deflection electrodes.

The electrode assembly may comprise a charge electrode for trapping electric charges on ink drops of the ink jet. The nozzle may be connected to ground, such that when a voltage is applied to the charge electrode a charging field is established between the nozzle and the charge electrode. The charge electrode may be provided at a fixed location relative to the nozzle and the gutter.

The method may comprise applying a time varying steering voltage to the at least one electrode.

By varying the steering voltage, the solvent jet may be caused to jump around.

The time varying voltage may be comprise a pulsed voltage (e.g. 2 seconds period square wave).

The method may comprise varying a rate at which solvent is ejected from the nozzle.

The method may comprise varying a pressure at which solvent is provided to the nozzle.

By varying the pressure and/or flow rate, the solvent jet may be caused to vary between positions and flow patterns (e.g. a straight jet and a spray), thereby causing least a portion of the solvent ejected in the jet to contact at least a part of the gutter surrounding the orifice for cleaning.

The method may comprise periodically turning on and off the solvent jet.

By periodically turning the jet on and off, it is possible to sequentially soak dried ink, and then wash or rinse away any dissolved ink, before again soaking and washing. Such a process may be repeated a plurality of times.

The method may comprise configuring the printhead in a cleaning configuration and then performing said cleaning operation while the printhead is configured in the cleaning configuration.

The method may comprise, after performing a printing operation, configuring the printhead in the cleaning configuration, and, after performing said cleaning operation, returning the printhead to the printing configuration.

When the printhead is in the cleaning configuration, the printhead may be positioned at a wash station remote from a printing location.

The wash station may comprise a printhead support and a solvent receptacle configured to receive rinse solvent.

The method may comprise, when the printhead is in the cleaning configuration, disabling the suction source.

Said disabling of the suction source may be performed for a portion of the time during which the printhead is in the cleaning configuration.

The method may comprise generating a signal indicating that a cleaning operation should be performed.

Said signal may be generated based data relating to operating conditions and/or usage of said printer. For example, said signal may be generated based on one or more of: a type of ink being used, and/or a solvent type, and/or a printing speed, and/or a duration since a previous printing operation, and/or a number of drops emitted since a previous cleaning operation, and/or one or more environmental conditions (e.g. humidity, temperature, etc).

The method may comprise generating said signal indicating that a cleaning operation should be performed based upon a predetermined condition being satisfied. Said predetermined condition may comprise a predetermined number of drops being ejected by the nozzle since a previous cleaning operation was performed.

The predetermined number of drops may, for example, be of the order of 109 drops. The predetermined number of drops may be a predetermined number of printed drops. That is, ejected drops which are directed to the gutter may not be counted, whereas ejected drops which are deflected for printing may be counted. The predetermined condition being satisfied may therefore comprise a predetermined number of drops being printed since a previous cleaning operation was performed.

The method may comprise generating said signal indicating that a cleaning operation should be performed based upon a signal being generated by a sensor.

The sensor may comprise an ink build-up sensor. The printhead may comprise an ink build-up sensor. The ink build-up sensor may comprise a sensor configured to detect a build-up of ink on the region surrounding the gutter orifice.

The method may comprise generating said signal indicating that a cleaning operation should be performed based upon a signal being received from a remote monitoring server.

The remote monitoring server may comprise a server configured to receive data relating to operating conditions and/or usage of one or more printers, and configured to process said received data to generated signals indicative of performance of said printers, and/or recommendations relating to control of said printers.

According to a second aspect of the invention there is provided a continuous inkjet printer, comprising: an ink supply system operable to supply ink to a print head; and a printhead operable to receive ink from the ink supply system for printing. The printhead comprises: a droplet generator comprising a printing nozzle for ejecting an ink jet for printing, at least one electrode for steering the ink jet, and a gutter having an ink receiving orifice for receiving parts of the ink jet which are not used for printing. The continuous inkjet printer is configured to perform a cleaning operation, said cleaning operation comprising: ejecting a solvent jet from the printing nozzle towards the gutter; and causing at least a portion of the solvent ejected in the jet to contact at least a part of the gutter surrounding the orifice for cleaning said part of the gutter surrounding the orifice.

The ink supply system may comprise an ink cartridge and a solvent cartridge, and the ink supply system may be operable to supply solvent based ink to the printhead in a printing mode and to supply solvent to the printhead in a cleaning mode.

The continuous inkjet printer may further comprise a controller configured to control said printer, and to cause said printer to perform said cleaning operation.

The continuous inkjet printer may further comprise a suction source connected to the gutter by a gutter line and configured to apply a negative pressure to the gutter during printing to draw ink which is not used for printing along the gutter line. The printer may be configured to disable the suction source for at least a portion of the time when said solvent jet is ejected from the printing nozzle towards the gutter.

The continuous inkjet printer may further comprise an electrode assembly configured to cause electric charges to be trapped on droplets of ink during printing operations, and to create an electrostatic field for deflecting ink drops carrying trapped electric charges, the printer may be configured to cause the electrode assembly to generate an electrostatic field to cause the solvent jet to be deflected.

Said electrode assembly may comprise a charge electrode for trapping electric charges on ink drops of the ink jet and first and second deflection electrodes for creating an electrostatic field for deflecting ink drops carrying trapped electric charges.

According to a third aspect of the invention there is provided computer readable instructions for a controller of a continuous inkjet printer. The continuous inkjet printer comprises an ink supply system operable to supply ink to a print head, a printhead operable to receive ink from the ink supply system for printing, and a controller for reading the computer readable medium and controlling operation of the continuous inkjet printer. The printhead comprises: a droplet generator comprising a printing nozzle for ejecting an ink jet for printing, at least one electrode for steering the ink jet, and a gutter having an ink receiving orifice for receiving parts of the ink jet which are not used for printing. The computer readable instructions, when executed by the controller, cause the continuous inkjet printer to: eject a solvent jet from the printing nozzle towards the gutter; and cause at least a portion of the solvent ejected in the jet to contact at least a part of the gutter surrounding the orifice for cleaning said part of the gutter surrounding the orifice.

The computer readable instructions may include further instructions for performing any of the method steps described above with reference to the first aspect. For example, the instructions may cause a suction source to be disabled from the gutter, and/or to cause the solvent get to be caused to deviate from a printing axis.

There is also provided a computer readable medium carrying instructions according to the third aspect of the invention.

The computer readable medium may carry further instructions for performing any of the method steps described above with reference to the first aspect. For example, the computer readable medium carry further instructions to cause a suction source to be disabled from the gutter, and/or to cause the solvent get to be caused to deviate from a printing axis.

According to a further aspect of the invention there is provided a method of updating a continuous inkjet printer. The printer comprises a printhead and a controller configured to control the printer. The printhead comprises a droplet generator comprising a printing nozzle for ejecting an ink jet for printing, at least one electrode for steering the ink jet, and a gutter having an ink receiving orifice for receiving parts of the ink jet which are not used for printing. The method comprises providing computer readable instructions for causing the printer to perform a cleaning operation to the controller, the instructions, when executed by the controller, being arranged to cause the continuous inkjet printer to eject a solvent jet from the printing nozzle towards the gutter, and cause at least a portion of the solvent ejected in the jet to contact at least a part of the gutter surrounding the orifice for cleaning said part of the gutter surrounding the orifice.

By updating the printer in this way, it is possible to enhance the performance of the printer, and obtain the benefits associated with the methods described further above, without modifying the hardware of the printer. Rather, a simple software update can be performed. Providing the instructions may comprise causing the instructions to be stored in a memory accessible by the controller.

Providing the instructions may comprise providing said instructions on a computer readable medium. Providing the instructions may comprise providing said instructions via a wireless network. Providing the instructions may comprise providing said instructions via a wired network.

Advantageously, the cleaning method may be performed using printers that are already in operation, by providing a software upgrade.

Any feature(s) described herein in relation to one aspect, embodiment, example or otherwise, may be combined with any other feature(s) described herein in relation to any other aspect, embodiment, example or otherwise, as appropriate and applicable.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. Unless indicated otherwise, arrows in the figures are used to show the intended direction of fluid flow. Embodiments of the present invention will now be described, by way of example only, with reference to the accompanying drawings, in which.

DETAILED DESCRIPTION

Figure 1:
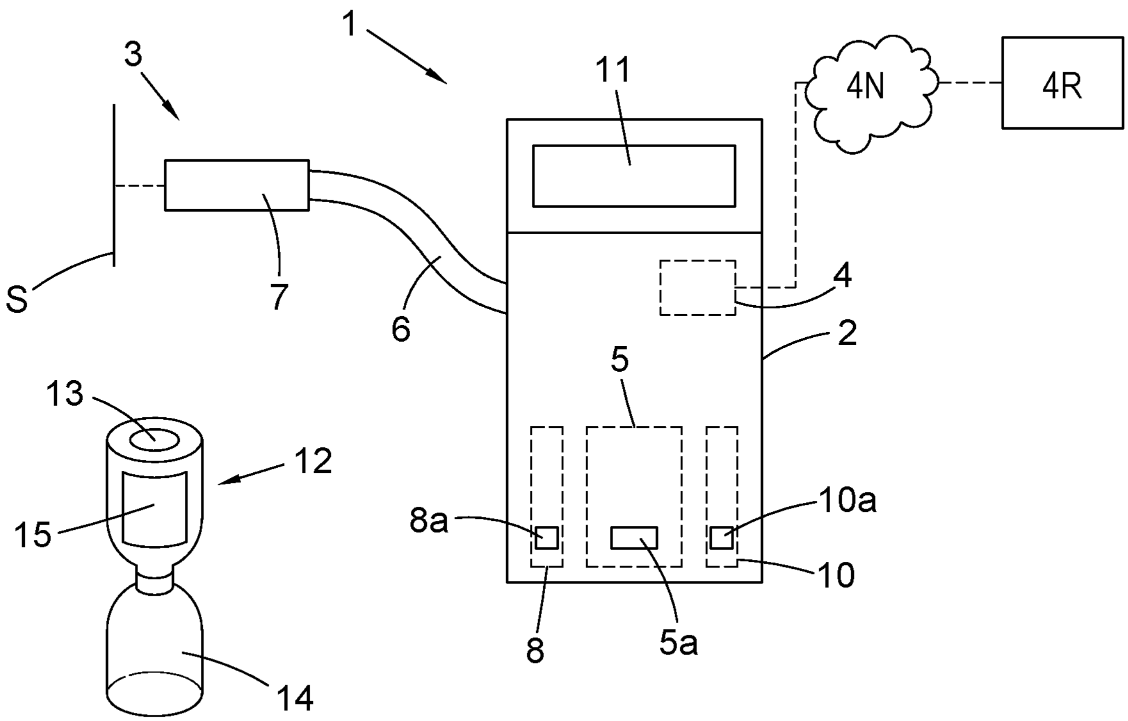
FIG. 1 shows a schematic illustration of a continuous inkjet printer.

Aspects and embodiments disclosed herein are not limited to the details of construction and the arrangement of components set forth in the following description or illustrated in the drawings. Aspects and embodiments disclosed herein are capable of being practiced or of being carried out in various ways.

FIG. 1 schematically illustrates an inkjet printer 1. In FIG. 1, control signals are illustrated schematically by dashed arrows, and hidden components are illustrated schematically by dashed lines. Inkjet printer 1 comprises an ink supply system 2, a print head 3 and typically a controller 4. The ink supply system 2 may typically comprise an ink mixing system 5. The ink supply system 2 is connected to the print head 3 by an umbilical cable 6.

In some embodiments, the controller 4 may be connected to a remote server 4R via a network 4N to enable remote monitoring and control of the printer 1. However, the remote server 4R is optional, such that the printer 1 may operate in isolation.

The ink mixing system 5 typically comprises two cartridge connections for engagement with a fluid cartridge. In particular, the ink mixing system 5 may comprise an ink cartridge connection for engagement with an ink cartridge 8 and a solvent cartridge connection for engagement with a solvent cartridge 10.

Each of the ink and solvent cartridge connections typically comprises a fluid connector for engaging an outlet of respective ink and solvent cartridges 8, 10 to allow fluid to flow from the cartridges 8, 10 into the ink system and/or print head 3. For example, ink and solvent can be caused to flow into the ink mixing system 5 from the cartridges 8, 10. In operation, ink from the ink cartridge 8 and solvent from the solvent cartridge 10 can be mixed within the ink mixing system 5 to generate printing ink of a desired viscosity suitable for use in printing. This ink is supplied to the print head 3 and unused ink is returned from the print head 3 to the ink mixing system 5. When unused ink is returned to the ink mixing system 5 from the print head 3, solvent saturated air may be drawn in with ink from a gutter of the print head 3.

The ink jet printer 1 is typically controlled by controller 4. Controller 4 receives signals from various sensors within the inkjet printer 1 and is operable to provide appropriate control signals to the ink supply system 2 and the print head 3 to control the flow of ink and solvent through the inkjet printer 1. The controller 4 may be any suitable device known in the art, and typically includes at least a processor and memory. The printer may comprise a user interface 11, which may comprise a touch screen, and which allows a user to receive signals, and to input control data for controlling the printer 1 (or for causing the controller 4 to control the printer 1).

The ink cartridge 8 may be provided with an electronic data storage device 8 a storing data relating to contained ink (e.g. type and quantity of ink). Similarly, the solvent cartridge 10 may be provided with an electronic data storage device 8 a storing data relating to contained solvent (e.g. type and quantity of solvent).

Other components within the printer may also be provided with electronic data storage devices. For example, the ink mixing system 5 may be provided with an electronic data storage device 5*a* which may store identification data (e.g.

an identification code). Electronic data storage device 5*a* may also store other types of data, such as identification data relating to the type of ink and/or solvent that the ink mixing system 5 can be used with (or has previously been used with), a model number of the ink mixing system 5 or inkjet printer 1, a serial number, a manufacture date, an expiration date, a date first used in service, number of hours the ink mixing system 5 has been used in the inkjet printer 1, service life, and the like.

The controller 4 is arranged to communicate with the electronic data storage devices 8*a*, 10*a* via an appropriate electrical contact arranged to contact a corresponding contact on the engaged ink or solvent cartridge 8, 10. The corresponding contact on the cartridges 8, 10 allows information to be read from and/or written to data storage devices 8*a*, 10*a*.

In operation, ink is delivered under pressure from ink supply system 2 to print head 3 and recycled back via flexible tubes which are bundled together with other fluid tubes and electrical wires (not shown) into the umbilical cable 6. The ink supply system 2 is typically located in a cabinet and the print head 3 is disposed outside of the cabinet, connected to the cabinet via the umbilical cable 6.

When installed, the printer 1 may be provided with a wash station 12. The wash station 12 comprises a printhead support region 13 and a solvent receptacle 14. The solvent receptacle may, for example, comprise a bottle attached (e.g. removably) to the bottom of the printhead support region 13 and configured to catch any solvent dripping of flowing from the printhead during the cleaning operation. The printhead support region 13 comprises a support which can support the printhead in an orientation suitable for cleaning. Such wash stations are routinely provided for prior art printers, and provide a cleaning window 15 through which solvent can be sprayed by a wash bottle to clean the components of the print head 3 which are exposed through the window 15. It will be appreciated that the print head 3, when in use, is typically encased within the print head cover 7. However, the print head cover 7 is typically removed for cleaning purposes.

Figure 2:
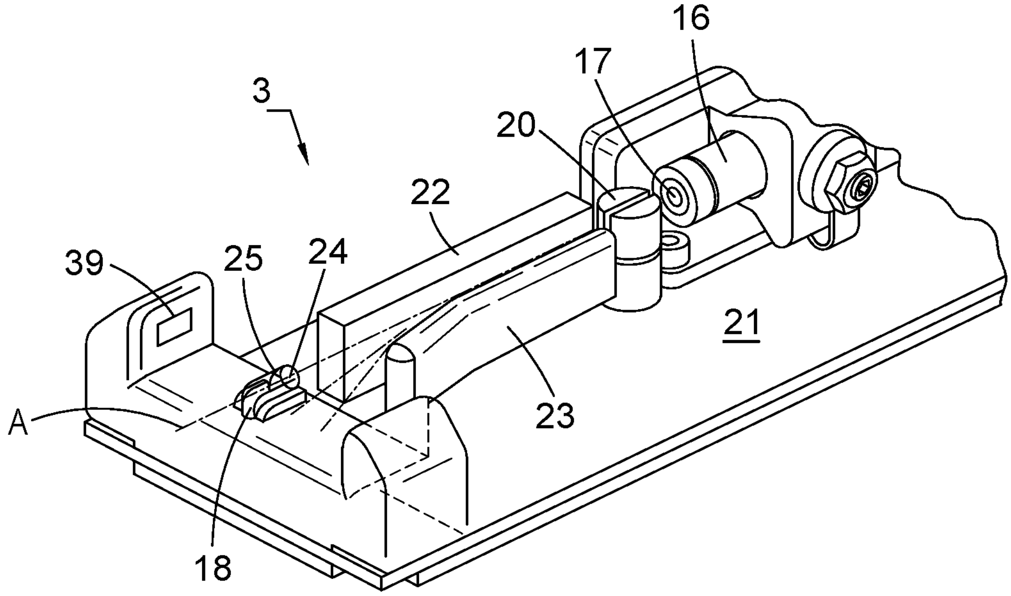
FIG. 2 shows a schematic illustration of a printhead for use with the printer of FIG. 1.

FIG. 2 shows schematically components of the print head 3 in more detail. The printhead comprises ink droplet generator 16 (which may also be referred to as an ink gun) having a nozzle 17, and a gutter 18. During printing operations, a jet of ink is ejected from the nozzle 17 of the droplet generator 16 towards the gutter 18 along a printing axis A. The droplet generator 16 further comprises a piezoelectric element 19 (not shown in FIG. 2) which allows the ink jet to be modulated, causing droplets to form within the jet in a predictable way.

A charge electrode 20 is provided adjacent to the droplet generator 16 and, as is well known in the art, configured to cause a charge to be induced on droplets as they break off from the ink jet emitted from the droplet generator 16. First and second deflection electrodes 22 and 23 are arranged either side of the printing axis A and are configured to cause the charged droplets to deflect from the printing axis A and therefore miss the entrance of the gutter 18. A voltage of around 6-8000 volts may be applied between the first and second deflection electrodes 22, 23 in order to cause the droplets to deflect. By varying the magnitude of the charge voltage applied to the charge electrode 20, the amount of charge induced on each of the droplets can be varied, and in this way the amount of deflection in the static electric field established between the deflection electrodes 22, 23 can be varied for each droplet.

The droplet generator 16, gutter 18, charge electrode 20 and deflection electrodes 22, 23 are all mounted on a printhead substrate 21, meaning that there is a fixed positional relationship between each of these components.

Figure 3:
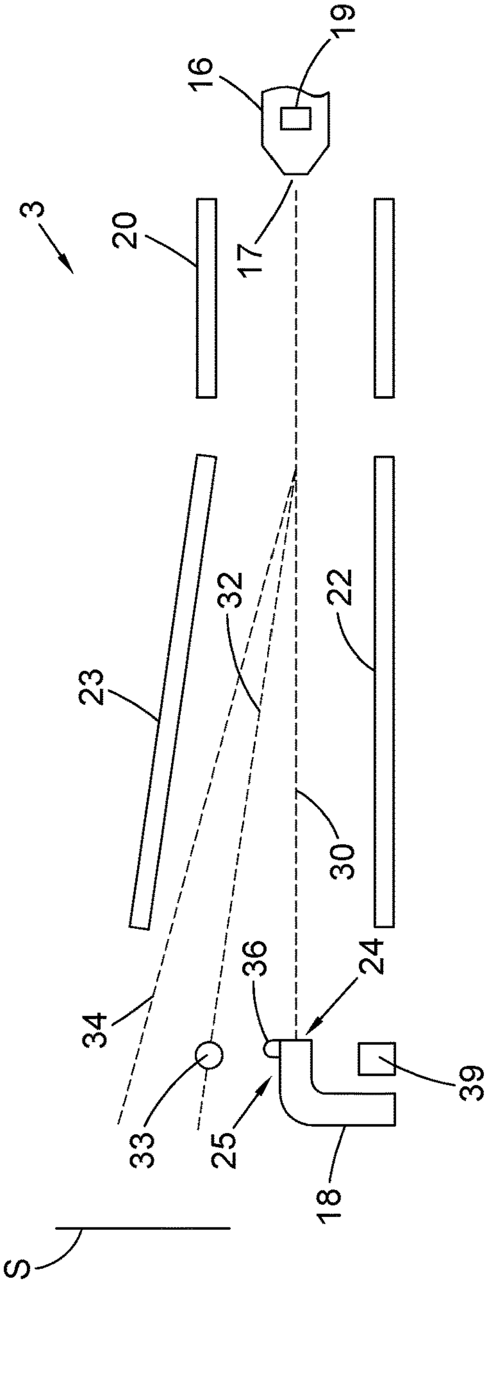
FIG. 3 shows schematically the operation of the printhead of FIG. 2.

FIG. 3 shows schematically the operation of the print head 3. A first ink path 30 is illustrated which shows the path of an un-deflected droplet of ink from the nozzle 17 to the gutter 18. The path 30 is coaxial with the printing axis A. A second droplet path 32 shows the possible path of a droplet which has had a small charge applied to it by the charge electrode 20, and which is caused to be deflected by the field between the deflection electrodes 22, 23. It can be seen that the second path 32 deviates from the first path 30 as the droplet passes between the deflection electrodes 22, 23 such that a droplet 33 passing along the second path 32 is caused to miss the gutter 18. A third path 34 is also shown which has a greater degree of deflection than the second path 32. It will of course be appreciated that a plurality of similar paths exist each of which is defined by a different extent of deflection from the initial path 30. It will be understood that by varying the extent of deflection of the ink droplets, ink can be caused to impact on a desired positioned of a substrate S placed behind the gutter 18, for example on a packaging line. By continually changing the charge on the charge electrode 20 and supplying a continuous stream of droplets from the droplet generator 16, it is possible to print letters and images on moving targets as they gradually move past the print head 3.

During printing some microsatellites or other splashes of ink may be generated which cause ink to accumulate on surfaces of the print head 3. For example, ink may accumulate on the surface of the gutter 18, or on other components of the print head such as for example the deflection electrodes 22, 23 or the charge electrode 20.

Figure 4:
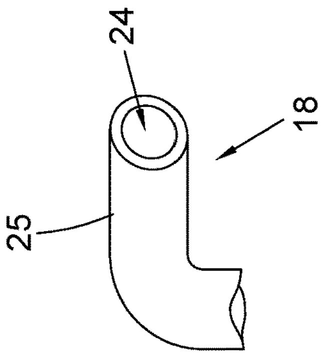
FIG. 4 shows a gutter of the printhead of FIG. 2 in more detail.

FIG. 4 shows the gutter 18 in more detail. The gutter comprises an orifice 24 into which ink that is not to be printed is received. The gutter further comprises a region 25 surrounding the orifice 24 which defines the orifice 24, and provides an enclosed gutter flow path for ink and solvent to be carried away from the orifice 24 (as described in more detail below).

During printing, ink may rebound from the gutter orifice 24 causing deposits to form around the orifice, and even on the region 25 surrounding of the orifice 24. As shown in FIG. 3, a deposit 36 is formed on the region 25 adjacent to the orifice 24. As the deposit 36 gradually grows in size, a distance 38 between the deposit 36 and the droplet 33 will gradually decrease.

The path 32 illustrates the path of a least deflected droplet which is intended for use in printing. That is, in use, no deflected droplets are used for printing which are deflected by an amount which is less than that illustrated by the path 32. In order to guarantee high quality printing, each of the droplets passing along the path 32 should not impact on any parts of the printhead 3 before the substrate S on which printing is to be carried out. As such, it is important that the droplet 33 passing along the least deflected path 32 does not collide with the deposit 36 on the side of the gutter 18. That is, if the distance 38 is reduced to zero, then printing quality can be severely impacted.

It is desirable therefore to provide a mechanism for removing the deposit 36 from the region 25 of the gutter 18.

As shown in FIG. 2, the print head 3 also includes a sensor 39, which is configured to detect a build-up of the ink on the region 25 surrounding the gutter orifice 24. The sensor 39 maybe referred to as an ink build-up sensor. The sensor 39 may be an optical sensor (although other types of sensors are possible), and may operate as described in published patent application no. WO 2015/187926. The sensor 39 may comprise a glass lens which is configured to receive an optical signal and direct it towards a detector provided behind the lens. In this way, the detector may be protected from damage, such as ink contamination.

Figure 5:
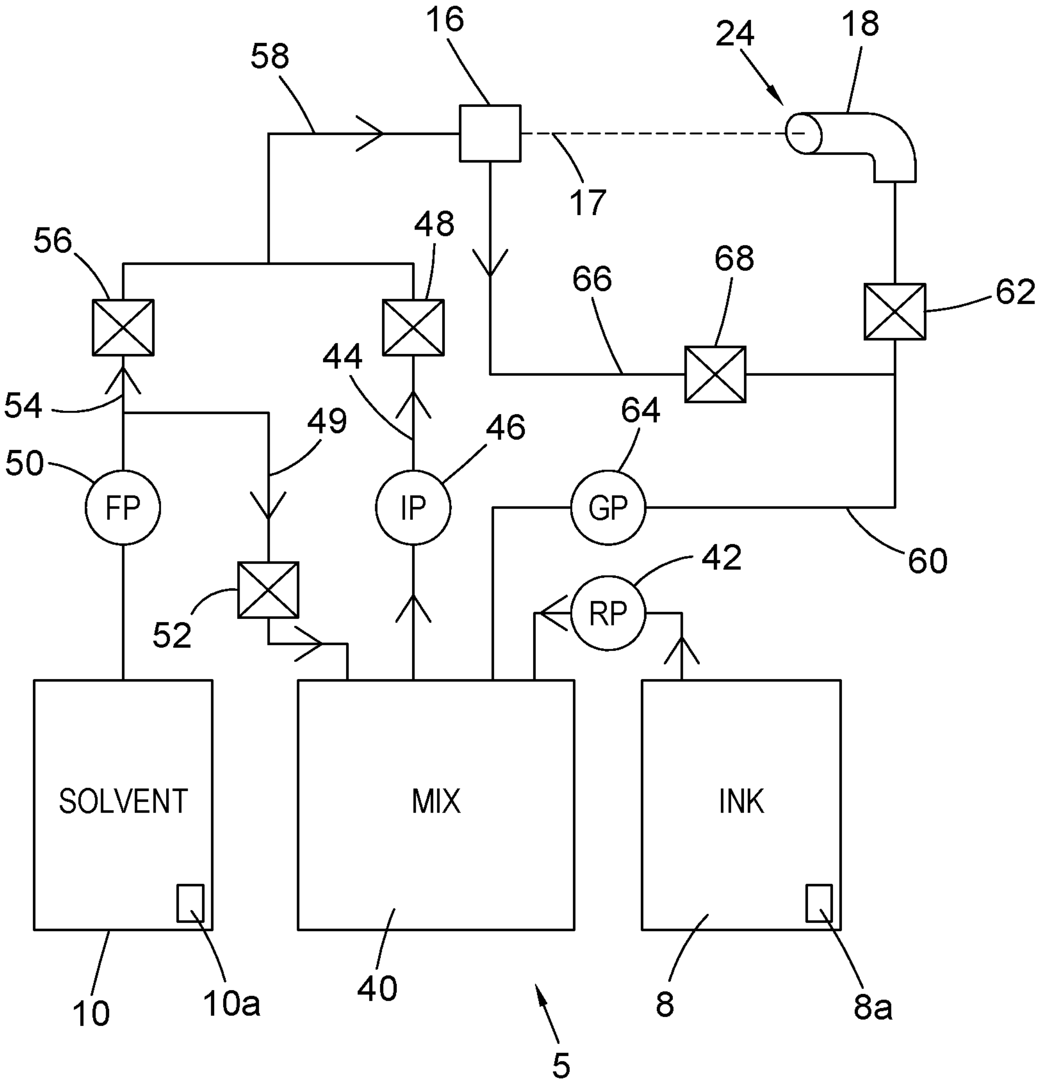
FIG. 5 shows schematically various components and flow paths within the printer of FIG. 1.

It will be understood that various pumps and valves may be provided within the ink supply system 2 and the print head 3. FIG. 5 shows various components provided in the printer. In FIG. 5, fluid flow through the printer 1 is illustrated schematically by solid arrows.

As described above with reference to FIG. 1, the printer is configured to receive an ink cartridge 8 and a solvent cartridge 10. The cartridges 8, 10 are both contained within the ink supply system 2, which further comprises the ink mixing system 5. The ink mixing system comprises a mixing tank 40.

Before printing operations are carried out, ink from the ink cartridge 8 is transferred to the mixing tank 40 by an ink refill pump 42. When required for printing, ink from the mixing chamber 40 can be pumped along an ink supply line 44 by an ink pump 46 towards the droplet generator 16. An ink valve 48 allows the ink supply line 44 to be selectively open or closed.

Solvent can be transferred from the solvent cartridge 10 to the mixing chamber (e.g. to adjust the viscosity of the ink) along a solvent refill line 49 under the action of a flush pump 50. A solvent refill valve 52 is configured to selectively block the supply of solvent from the flush pump 50 to the ink mixing tank 40. The solvent can also be supplied to the droplet generator 16 from the solvent cartridge 10 under the influence of the flush pump 50 along a solvent supply line 54. A flush valve 56 is configured to allow or prevent the flow of solvent along the solvent supply line 54.

Each of the ink supply line 44 and solvent supply line 54 is combined together to provide a droplet generator supply line 58 with the ink valve 48 and flush valve 56 each being configured to connect either one of the ink supply line 44 or solvent supply line 54 to the droplet generator supply line 58.

As described above with reference to FIGS. 2-4, the gutter 18 within the print head 3 is configured to collect un-printing ink. The gutter 18 is connected via a gutter line 60 to the mixing tank 40. A gutter valve 62 is provided within the gutter supply 60, and is configured to selectively block or permit fluid to flow along the gutter line 60. A gutter pump 64 is also provided within the gutter line and is configured to apply a suction force to the gutter line 60 drawing air, ink, or solvent into the gutter 18 and causing it to flow along the gutter line 60 and into the ink mixing tank 40.

A purge line 66 is also provided. The purge line 66 is connected between the droplet generator 16 and the gutter line 60. A purge valve 68 is provided between the droplet generator 16 and the point at which the purge line 66 meets the gutter line 60, enabling the purge line 66 to selectively connect or disconnect the droplet generator 16 from the gutter line 60. When the droplet generator 16 is connected to the gutter line 60 via the purge line 66, the gutter pump 64 applies suction along the gutter line 60 and the purge line 66 to the droplet generator 16.

Each of the ink refill pump 42, the ink pump 46, the flush pump 50, the gutter pump 64 are controlled by the controller 4. Similarly the solvent refill valve 52, the ink valve 48, the flush valve 56, the gutter valve 62, and the purge valve 68 are also controlled by the controller 4.

It will of course be appreciated that different arrangements of the components may be possible. Moreover, certain ones or these components may be provided by a common component. For example, the ink pump 46 may be configured to cause the gutter pump 64 to operate. For example, the ink pump 46 may, when activated, cause ink to flow along a recirculation path within the ink mixing system 2, thereby activating a Venturi pump which serves the purpose of the gutter pump 64. In this way, activating the ink pump 46 may effectively activate the gutter pump 64. Moreover, when the ink valve 28 is closed, activating the ink pump 46 will not cause any ink to flow along the ink supply line 44 and to the droplet generator 16.

During printing operations, the printer may be operated as described in more detail in published patent application no. WO 2016/205168.

Figure 6:
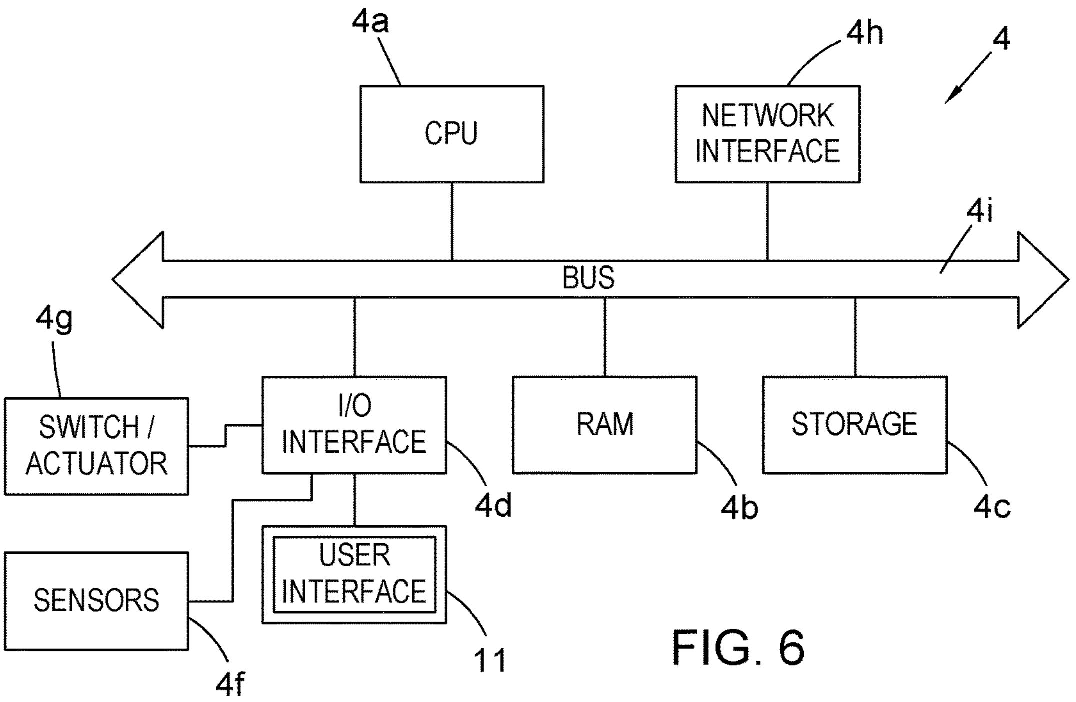
FIG. 6 shows schematically a controller of the printer of FIG. 1 in more detail.

The controller 4 will now be described in more detail with reference to FIG. 6. It can be seen that the controller comprises a CPU 4*a* which is configured to read and execute instructions stored in a volatile memory 4*b* which takes the form of a random access memory. The volatile memory 4*b* stores instructions for execution by the CPU 4*a* and data used by those instructions. For example, in use, data received from sensors associated with the print head 3, or the ink supply system 2 may be stored in the volatile memory 4*b*.

The controller 4 further comprises non-volatile storage 4*c*, which may be in the form of a solid-state drive. Printing data may be stored on the storage 4*c*. The controller 4 further comprises an I/O interface 4*d* to which are connected peripheral devices used in connection with the controller 4. More particularly, the user interface 11 is connected via the I/O interface 4*d* and configured to display output from the controller 4, and to receive user input via a touch screen interface. The user interface 11 may, for example, display printing data.

Other input devices may also be connected to the I/O interface 4*d*. Such input devices may include various sensors 4*f* (e.g. ink build-up sensor 39), which allow the controller 4 to receive data relating to the print head. Other output devices 4*g* may also be connected to the I/O interface 4*d*. Such output devices may include various actuators and switches required for operation of the printer 1, such as those described above with reference to FIG. 5.

A network interface 4*h* allows the controller 4 to be connected to an appropriate computer network so as to receive and transmit data from and to other computing devices (e.g. remote server 4R). The CPU 4*a*, volatile memory 4*b*, storage device 4*c*, I/O interface 4*d*, and network interface 4*h*, are connected together by a bus 4*i*.

Figure 7:
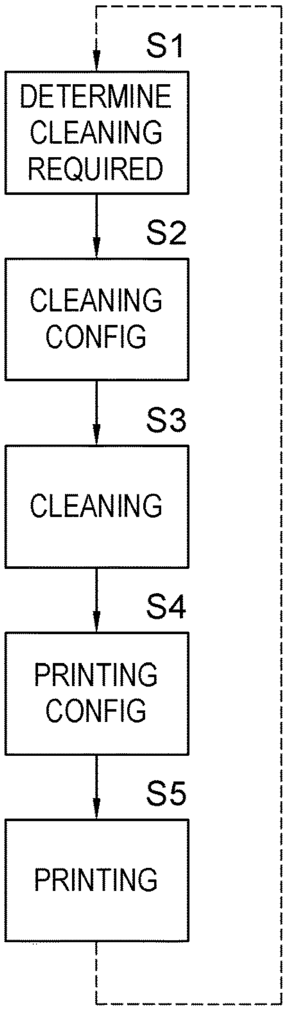
FIG. 7 shows a flowchart illustrating a method of operating the printer of FIG. 1.

In order to perform a cleaning operation, the printer 1 may be operated in accordance with the sequence illustrated in FIG. 7. As a first step S1, it is determined that a cleaning operation should be carried out. At step S2 the print head 3 is re-configured from a printing configuration (i.e. a configuration in which it can perform printing operations) to be in a cleaning configuration. This may comprise moving the printhead from a location where it is installed for performing printing operations (i.e. a printing location) to a dedicated cleaning location, e.g. a wash station 12 as illustrated schematically in FIG. 1.

Alternatively, the cleaning configuration may comprise making one or more simple changes to the print head 3 while leaving it in its previous location (i.e. printing location). Such changes may comprise, for example, attaching a hood or solvent catcher to the print head 3, so any cleaning solvent will be caught, rather than reaching and possibly contaminating the production line. It will be understood that such a configuration may only be appreciated that in certain circumstances. For example, where the print head 3 is oriented in a vertical orientation, with the gutter 18 positioned towards the bottom, a solvent catcher may be positioned below the print head 3 to enable an in-situ cleaning operation to be performed.

Once the printhead has been placed in the cleaning configuration, at step S3, the cleaning operation can be performed. Once completed, at step S4 the printhead is then returned to the printing configuration. Further printing operations may then be performed at step S5, until a further determination is made for a cleaning operation to be performed, with the process returning to step S1, and repeating as described above.

It will, of course, the appreciated that the process described above may be performed at any convenient interval, or on the basis of any suitable determination that cleaning should be performed. Moreover, while it is described that the process immediately follows, and is followed by, printing operations. In some circumstances, it may be desirable for the cleaning operation to be performed in isolation, or at start-up (i.e. after a period of idle) or at shutdown (i.e. before a period of idle).

The determination that cleaning should be performed may be made by a user selecting a cleaning option via the user interface 11. The user may be prompted to perform a cleaning operation by a software routine running on the controller 4. The software running on the controller may generate a signal (e.g. which may be displayed on the user interface 11) indicating that a cleaning operation should be performed, or recommending that a cleaning operation should be performed at the next convenient time.

Such a signal may be generated based data relating to operating conditions and/or usage of said printer, which may, together or separately, define one or more predetermined conditions. For example, said signal may be generated by taking into account various factors such as, for example, a type of ink being used, a solvent type being used, a printing speed, a duration since a previous printing operation, a number of drops emitted since a previous cleaning operation, one or more environmental conditions (e.g. humidity, temperature, etc.).

In one embodiment the signal indicating that a cleaning operation should be performed may be generated after a predetermined number of printed drops (e.g. $10^9$ drops) has been ejected by the nozzle since a previous cleaning operation was performed. Of course, a different number of drops may be used. Similarly a different metric may also be used. For example, ejected drops (rather than just printed drops) may also be monitored.

In some embodiments an output of the ink build up sensor 39 may be monitored and used to generate the signal indicating that a cleaning operation should be performed.

Alternatively, the user may be prompted to perform a cleaning operation by a software routine running on the remote server 4R which is operably connected to the printer 1 via the network 4N. For example, the server may comprise a remote monitoring server configured to receive data relating to operating conditions and/or usage of one or more printers, and configured to process said received data to generate signals indicative of performance of said printers, and/or recommendations relating to control of said printers. When the server has determined that a cleaning operation would be beneficial, it may be configured to send a signal to the printer. Upon receiving such a signal, the printer may generate a use prompt via the user interface, or may schedule a cleaning operation at a suitable time.

Figure 8:
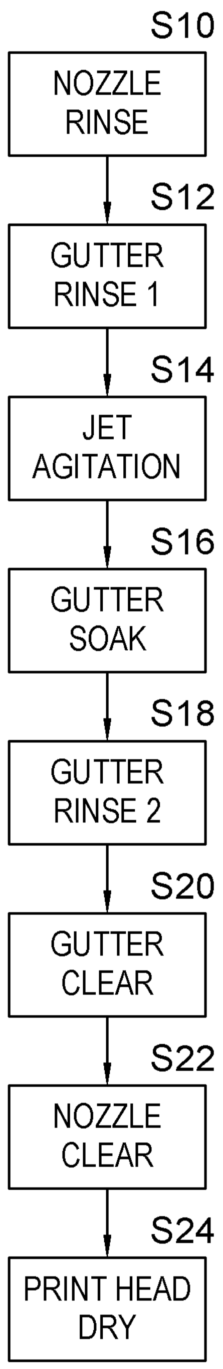
FIG. 8 shows a flowchart illustrating a cleaning operation for cleaning parts of the printhead of FIG. 2.

The cleaning operation (i.e. step S3) will now be described in more detail with reference to the flow diagram shown in FIG. 8. At a first step S10, a nozzle rinse procedure is performed. The nozzle rinse procedure may be performed a plurality of times (e.g. greater than 10 times) with each iteration comprising opening each of the flush valve 56 and the purge valve 68 and also applying a modulation voltage at various levels to the piezo electric element 19. The nozzle rinse procedure is used to clean the droplet generator 16 and nozzle 17 by causing the droplet generator body to vibrate at different amplitudes. During each iteration of the nozzle rinse procedure the flush and purge valves 56, 68 may also be opened and closed. Opening and closing the valves 56, 68 allows pressure pulsations within the droplet generator 16 and the fluid lines connected to the droplet generator 16 to cause any fluid within the droplet generator 16 to be ejected. Once the nozzle rinse process S10 is complete the procedure passes to step S12 where a gutter rinse process is performed.

During the gutter rinse process the gutter pump 64 may be activated to provide a negative pressure on the gutter line 60. The gutter valve 62 may also be opened to ensure that the negative pressure is exposed to the orifice 24 of the gutter 18. During the gutter rinse process, the flush pump 50 may also be activated, to provide a supply of solvent to the droplet generator 16. During the initial portion of the rinse process, a jet of solvent may be caused to flow out of the nozzle 17 and into the orifice 24 of the gutter 18. However, after a predetermined period of time, the gutter valve 62 may be closed. This will result in the negative pressure provided by the gutter pump 64 being prevented from reaching the gutter 18, thereby causing the solvent flowing into the gutter orifice 24 to quickly fill the region within the gutter 18, and then overflow from the orifice 24. This process will cause the solvent to flow out of the orifice 24, and onto the region 25 surrounding the orifice 24, thereby washing away any deposits of ink (e.g. deposit 36) which may have formed on the outer region 25 of the gutter 18.

Processing then passes to step S14 during which the solvent jet may be agitated. The solvent jet may be agitated in a number of ways.

For example, in an embodiment, the solvent jet is agitated by periodically activating and deactivating the high voltage supply to provide a switched deflection field between the deflection electrodes 22, 23. For example, a voltage of 6-8000 volts (the EHT voltage) may be applied to the deflection electrode 23 while a ground voltage is applied to the deflection electrode 22. In this way, an electric field is established between the electrodes 22, 23, causing the jet of solvent between the electrodes 22, 23 to become charged. Once the jet has become charged, parts of the jet that have broken off into droplets will be caused to deviate from the print axis A as denoted by path 30 in FIG. 3. By periodically activating and deactivating the EHT voltage, it is possible to cause the solvent jet to jump around between several positions in a chaotic manner.

It will be understood that this operation is distinct from the steering of ink during the printing process. During printing, a charge is generally first to be applied to a particular droplet by the charge electrode 20, and the deflection electrodes 22, 23 are then used to accurately deflect the charged droplet according to the required printing positions in a precisely controlled manner. However, by only using the deflection electrodes and applying a time varying field, it is possible to both charge and deflect the solvent jet with the same set of electrodes. Of course, the charge electrode could also be used to induce a charge on the solvent jet if required.

In more detail, the solvent jet may emerge from the nozzle 17 as a continuous jet. Under the influence of surface tension, the jet will eventually break up into droplets. However, depending on the jet conditions (e.g. solvent pressure, flow rate, nozzle size, solvent type, temperature, etc.) the jet may break up randomly into a number of droplets. As droplets break up they will become charged in the deflection field, and further exposure to the deflection field will cause any charged droplets to become deflected. By turning the deflection field on and off periodically, it is possible to cause the jet or droplets to jump around in a somewhat chaotic manner. Of course, it will be appreciated that such behaviour would not be desirable during printing. However, during a cleaning operation, it has been realized that by steering the solvent in this way, it is possible to cause the solvent to impinge upon parts of the gutter 18 that would otherwise not be contacted by any solvent, other than negligible amounts via back splash. By causing the jet to be deflected in this way, it is possible to cause solvent to impinge upon the region 25 surrounding the orifice 24. In the same way, solvent may also be caused to impinge upon other parts of the printhead, such as, for example, the glass lens of the build-up sensor 39.

The process of turning on and off the EHT voltage may be repeated a plurality of times. For example, the process may be repeated around five times, with an "on" period of around two seconds, followed by an "off" period of around two seconds. Once the solvent jet agitation process has been completed, the cleaning operation proceeds to step S16 where a gutter soaking process is performed.

As described above with reference to the solvent jet agitation process, a jet of solvent is emitted from the nozzle 17 towards the gutter 18. In the soaking step S16, the flush valve 56 is closed, preventing further solvent from being emitted from the nozzle 17. However, any solvent that has already been directed towards the gutter 18, will remain around the gutter 18, and will soak any remaining ink deposits there. The soaking process may last for a period of for example five seconds. Following the soaking process, there is a further rinse process at step S18.

First, the solvent supply may be restarted and stopped, so as to rinse away any dissolved or softened solvent which has been dislodged or dissolved during the preceding cleaning processes. After the rinse process S18, the soaking process S16 may be repeated again.

At the end of the rinse step S18, the flush valve is again closed to prevent any further solvent from being ejected from the nozzle, and the flush pump may then be disabled.

At a next processing step S20, a gutter clearing process is performed. During the gutter clearing process, the negative pressure is again provided to the gutter 18 to draw any remaining solvent in or around the orifice 24 into the orifice and along the gutter line 60.

A nozzle clearing process follows at step S22. During the nozzle clearing process S22, the negative pressure may be blocked from reaching the gutter 18 (e.g. by closing gutter valve 62), and instead applied to the droplet generator 16 (e.g. by opening the purge valve 68). The suction provided to the droplet generator 16 may be turned on and off a plurality of times, with a period of dwell time between each switching. Such operation allows the suction applied to the droplet generator 16 to draw any solvent remaining within the droplet generator 16 and nozzle 17 to be drawn away to the gutter line 60.

Finally, during a drying process S24, the gutter suction pump 64 may be disabled before a final wait period of around 10 seconds is provided to allow the cleaned gutter 18 and nozzle 17 to dry.

At the conclusion of the cleaning operation described above, processing may then return to normal printer operations such as for example step S4 described above with reference to FIG. 7.

It will, of course be understood that the above described cleaning operation is provided as an example only, and that steps described are not all essential. Similarly, the way in which each process is performed may also be modified (e.g. by changing the sequence, timing, or number of repetitions performed).

For example, a cleaning operation may comprise just step S12 (i.e. a gutter rinse process). Such a step may comprise providing solvent to the gutter 18 form the nozzle 17, and allowing the gutter 18 to overflow, such that solvent washes away solvent deposits around the gutter orifice 24.

Further, while the jet agitation process S14 is described above, this is not essential for all cleaning operations. Where a jet agitation process is performed, this may be performed in a variety of ways. For example, the solvent jet may be disturbed by modulating the pressure and/or rate at which solvent is pumped to the droplet generator 16. The pressure at which solvent is delivered to the droplet generator may be modified by altering the speed at which the flush pump 50 operates. The solvent jet can also be disturbed by switching the flush valve 56 on and off. By varying the pressure and/or flow rate, the solvent jet may be caused to vary between positions and flow patterns (e.g. a straight jet and a spray), thereby causing least a portion of the solvent ejected in the jet to contact at least a part of the gutter surrounding the orifice for cleaning (or other regions of the printhead other than the gutter orifice). Such processing may be performed instead of, or as well as, the deflection field jet agitation described above.

Where a deflection field is used in the jet agitation process, this could also be performed differently. For example, a different waveform (e.g. a sinusoid, saw-tooth, ramp, series of steps, etc.) could be applied to the EHT voltage to cause the solvent jet to become charged and deflected.

The cleaning operation described above is primarily concerned with cleaning the gutter 18, and immediately surrounding areas of the printhead 3. It will be understood, however, that the process may also be used to clean other components of the print head 3. For example, the jet may be deflected sufficiently to also clean components such as the ink build up sensor 39. In particular, the process may be used to clean the lens of the ink build-up sensor 39. Further, in some embodiments, the jet may be deflected to clean at least a part of the deflection electrodes.

The printer 1 may be configured to perform cleaning operations as described herein during manufacture, or at any point after this. For example, a memory associated with the controller 4 may be updated to store computer readable instructions configured to cause the printer to perform a cleaning operation. Such an update may be performed by providing computer readable instructions on a suitable a computer readable medium (e.g. a USB drive), or via a wired or wireless network. For example, the software update may be transferred to the printer 1 via a Bluetooth connection.

The above embodiments are described by way of example only. Many variations are possible without departing from the scope of the invention as defined in the appended claims.

The invention claimed is:

1. A method of operating a continuous inkjet printer, the printer comprising a printhead, the printhead comprising:

a droplet generator comprising a printing nozzle for ejecting an ink jet for printing, at least one electrode for steering the ink jet, and a gutter having an ink receiving orifice for receiving parts of the ink jet which are not used for printing;

the method comprising performing a cleaning operation, the cleaning operation comprising:

ejecting a solvent jet from the printing nozzle towards the gutter; and causing at least a portion of the solvent jet to contact at least a part of the gutter surrounding the ink receiving orifice for cleaning the part of the gutter surrounding the ink receiving orifice.

2. The method according to claim 1, wherein the printer further comprises a suction source connected to the gutter by a gutter line and configured to apply a negative pressure to the gutter during printing to draw ink which is not used for printing along the gutter line; wherein the method comprises disabling the suction source for at least a portion of the time when the solvent jet is ejected from the printing nozzle towards the gutter.

3. The method according to claim 2, comprising configuring the printhead in a cleaning configuration and then performing the cleaning operation while the printhead is configured in the cleaning configuration, and when the printhead is in the cleaning configuration, disabling the suction source.

4. The method according to claim 1, wherein the causing at least a portion of the solvent jet to contact at least a part of the gutter surrounding the ink receiving orifice for cleaning comprises causing the solvent jet to deviate from a printing axis which extends from the nozzle to the ink receiving orifice.

5. The method according to claim 4, wherein the causing the solvent jet to deviate from the printing axis comprises generating an electrostatic field for deflecting the solvent jet.

6. The method according to claim 5, wherein generating the electrostatic field comprises applying a time varying steering voltage to the at least one electrode.

7. The method according to claim 1, comprising varying at least one of: a rate at which solvent is ejected from the nozzle, and a pressure at which solvent is provided to the nozzle.

8. The method according to claim 1, comprising periodically turning on and off the solvent jet.

9. The method according to claim 1, comprising configuring the printhead in a cleaning configuration and then performing the cleaning operation while the printhead is configured in the cleaning configuration.

10. The method according to claim 9, comprising, after performing a printing operation, configuring the printhead in the cleaning configuration, and, after performing the cleaning operation, returning the printhead to the printing configuration.

11. The method according to claim 9, wherein, when the printhead is in the cleaning configuration, the printhead is positioned at a wash station remote from a printing location.

12. The method according to claim 1, comprising generating a signal indicating that a cleaning operation should be performed.

13. The method according to claim 12, comprising generating the signal indicating that a cleaning operation should be performed based upon at least one of:

a predetermined condition being satisfied, wherein the predetermined condition comprises a predetermined number of drops being ejected by the nozzle since a previous cleaning operation was performed; a signal being generated by a sensor; and a signal being received from a remote monitoring server.

14. The method of operating a continuous inkjet printer according to claim 1, the method comprising providing computer readable instructions for causing the printer to perform the cleaning operation to a controller of the printer, the instructions, when executed by the controller, being arranged to cause the continuous inkjet printer to:

eject a solvent jet from the printing nozzle towards the gutter; and cause at least a portion of the solvent jet to contact at least a part of the gutter surrounding the ink receiving orifice for cleaning the part of the gutter surrounding the ink receiving orifice.

15. A continuous inkjet printer, comprising:

an ink supply system operable to supply ink to a print head; and a printhead operable to receive ink from the ink supply system for printing, wherein the printhead comprises:

a droplet generator comprising a printing nozzle for ejecting an ink jet for printing, at least one electrode for steering the ink jet, and a gutter having an ink receiving orifice for receiving parts of the ink jet which are not used for printing;

wherein the continuous inkjet printer is configured to perform a cleaning operation, the cleaning operation comprising:

ejecting a solvent jet from the printing nozzle towards the gutter; and causing at least a portion of the solvent jet to contact at least a part of the gutter surrounding the ink receiving orifice for cleaning the part of the gutter surrounding the ink receiving orifice.

16. The continuous inkjet printer according to claim 15, further comprising a controller configured to control the printer, and to cause the printer to perform the cleaning operation.

17. The continuous inkjet printer according to claim 15, further comprising a suction source connected to the gutter by a gutter line and configured to apply a negative pressure to the gutter during printing to draw ink which is not used for printing along the gutter line; wherein the printer is configured to disable the suction source for at least a portion of the time when the solvent jet is ejected from the printing nozzle towards the gutter.

18. The continuous inkjet printer according to claim 15, further comprising an electrode assembly configured to cause electric charges to be trapped on droplets of ink during printing operations, and to create an electrostatic field for deflecting ink drops carrying trapped electric charges, the printer being configured to cause the electrode assembly to generate an electrostatic field to cause the solvent jet to be deflected.

19. The continuous inkjet printer according to claim 18, wherein the printer being configured to cause the electrode assembly to generate the electrostatic field to cause the solvent jet to be deflected comprises the printer being configured to cause the electrode assembly to generate the electrostatic field to cause the solvent jet to deviate from a printing axis which extends from the nozzle to the ink receiving orifice.

20. The continuous inkjet printer according to claim 19, wherein generation of the electrostatic field comprises application of a time varying steering voltage to the at least one electrode.

21. The continuous inkjet printer of claim 15, wherein the causing at least a portion of the solvent jet to contact at least a part of the gutter surrounding the ink receiving orifice for cleaning comprises causing the solvent jet to deviate from a printing axis which extends from the nozzle to the ink receiving orifice.

22. Computer readable instructions for a controller of a continuous inkjet printer, the continuous inkjet printer comprising an ink supply system operable to supply ink to a print head, a printhead operable to receive ink from the ink supply system for printing, and a controller for reading the computer readable medium and controlling operation of the continuous inkjet printer;

wherein the printhead comprises:

a droplet generator comprising a printing nozzle for ejecting an ink jet for printing, at least one electrode for steering the ink jet, and a gutter having an ink receiving orifice for receiving parts of the ink jet which are not used for printing; and wherein the computer readable instructions, when executed by the controller, cause the continuous inkjet printer to:

eject a solvent jet from the printing nozzle towards the gutter; and cause at least a portion of the solvent jet to contact at least a part of the gutter surrounding the ink receiving orifice for cleaning the part of the gutter surrounding the ink receiving orifice.

23. The computer readable medium carrying instructions according to claim 22.

24. The computer readable instructions according to claim 22, wherein the computer readable instructions to cause the continuous inkjet printer to cause at least a portion of the solvent jet to contact at least a part of the gutter surrounding the ink receiving orifice comprises computer readable instructions to cause the continuous inkjet printer to cause the solvent jet to deviate from a printing axis which extends from the printing nozzle to the ink receiving orifice.

25. The computer readable instructions according to claim 24, wherein the computer readable instructions to cause the continuous inkjet printer to cause the solvent jet to deviate from the printing axis comprises computer readable instructions to cause the continuous inkjet printer to generate an electrostatic field for deflecting the solvent jet.

26. The computer readable instructions according to claim 25, wherein computer readable instructions to cause the continuous inkjet printer to generate the electrostatic field comprises computer readable instructions to cause the continuous inkjet printer to apply a time varying steering voltage to the at least one electrode.

* * * * *